_United States Patent Office_

2,775,573
Patented Dec. 25, 1956

2,775,573

DYEABLE POLYMER BLENDS, INCLUDING COPOLYMERS OF ACRYLONITRILE WITH ALKENYL HALOACETATES

Alfred B. Craig and George E. Ham, Decatur, Ala.

No Drawing. Application March 2, 1953,
Serial No. 339,912

8 Claims. (Cl. 260—45.5)

This invention relates to polymeric compositions having unusual fiber-forming properties. More specifically the invention relates to polymeric acrylonitrile compositions capable of being converted readily into dyeable general purpose fibers.

This application is a continuation-in-part of our copending application Serial No. 208,088, filed January 26, 1951, Patent No. 2,719,834, issued October 10, 1955.

It is well-known that polyacrylonitrile, and various copolymers of acrylonitrile and other olefinic monomers, can be spun into synthetic fibers having unusual physical properties. Because polyacrylonitrile and the many copolymers of acrylonitrile are almost inert chemically, conventional dyeing procedures are not useful in processing them. Many copolymers of acrylonitrile have been prepared using as the comonomers substances which impart dye-affinity. Copolymers of this type are not always satisfactory because of the excessive cost of the dye-receptive comonomers and because the introduction of such substances often depreciates the desirable fiber-forming characteristics of the copolymer.

The primary purpose of this invention is to provide a new acrylonitrile polymer composition which has the chemical and physical properties of polyacrylonitrile and which can be made completely dye-receptive by simple readily practicable procedures. A further purpose of this invention is to provide a means for converting non-dyeable acrylonitrile polymers into a dye-receptive form. A still further purpose is to provide new general synthetic fibers.

In accordance with this invention it has been found that polyacrylonitrile and other non-dyeable polymers of acrylonitrile, for example the copolymers of over 80 percent acrylonitrile and up to 20 percent of other olefinic monomers, such as vinyl acetate, styrene, alpha-methylstyrene, methacrylonitrile, vinyl chloride, vinylidene chloride, and the various alkyl acrylates, alkyl methacrylates, alkyl fumarates, and alkyl maleates wherein the alkyl groups have up to four carbon atoms may be readily converted into dyeable polymers. This is achieved by blending the non-dyeable polymers with polymeric compositions derived by the polymerization of unsaturated esters of haloacetic acid which polymeric compositions have been previously treated or are thereafter treated in the blended form with thiourea and alkyl substituted thioureas. Suitable monomers for polymerization into the useful polymeric compositions are those represented by the generic formula:

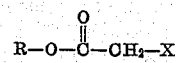

wherein X is a halogen atom and R is a radical selected from the group consisting of vinyl, allyl, methallyl and isopropenyl. Suitable monomeric substances include vinyl chloroacetate, allyl chloroacetate, methallyl chloroacetate, isopropenyl chloroacetate, and the corresponding bromine analogues.

The proportions of the unsaturated halogen containing polymer will depend upon the degree of dye-receptivity desired, and upon the proportion of the alkenyl chloroacetate in the blending polymer. In general, it is desirable to have from two to 20 percent of the fiber-forming composition in the polymeric form of the alkenyl chloroacetate. Thus, if the blending polymer is 100 percent alkenyl chloroacetate polymer, from two to 20 percent will be required to develop suitable dye-receptivity. If a copolymer of the chloroacetate and another monomer is used, proportionately more will be required to obtain the desired end result. Polymers of more than 30 percent of the haloacetate monomers and up to 70 percent of another olefinic monomer may be employed. These other monomers may be acrylonitrile, methacrylonitrile, vinyl acetate, vinyl chloride, vinylidene chloride, styrene, alpha-methylstyrene, and the various alkyl acrylates, alkyl methacrylates, alkyl fumarates, and the alkyl maleates, wherein the alkyl radicals have up to four carbon atoms. Because copolymers of acrylonitrile have unusual solvent and chemical resistance the preferred blending polymer is one of substantial portions of acrylonitrile and sufficient of the chloroacetate monomer to develop dye-receptivity in the portions to be blended with the fiber-forming acrylonitrile polymers. A very useful blending polymer is one of 50 percent acrylonitrile and 50 percent of the alkenyl chloroacetate, for example methallyl chloroacetate.

The base polymers are preferably prepared in an aqueous medium in the presence of a water-soluble peroxy catalyst and in the presence of an agent which maintains the polymer formed in a fine but granular dispersed condition. Suitable peroxy catalysts are the alkali metal persulfates and suitable dispersing agents are the alkali metal salts of sulfonated hydrocarbons. Polymerization may be conducted by batch procedures, by continuous procedure or by combination of these procedures. A preferred method of preparation involves a batch procedure wherein the desired monomers are mixed and charged gradually throughout the polymerization. Unusually uniform polymers may be obtained by also charging the catalyst and emulsifier continuously or in increments throughout the course of the reaction. More uniform polymerization conditions may be achieved by operating at uniform temperatures, for example the reflux temperature of the medium, especially if the operation is so conducted as to provide a constant temperature at reflux.

If desired, the polymerization reaction may be conducted in the presence of a "redox" agent, for example, sulfur dioxide, sodium bisulfite, sodium thiosulfate, or other sulfur compounds in which the sulfur is present in an oxidizable condition. Other optional procedures may involve the use of regulators which serve as chain terminators to prevent the formation of very high molecular weight increments, agents of this type being t-dodecyl mercaptan, thioglycolic acid, and dithioglycidol.

The procedure for preparing blending polymer is substantially the same as that used in the preparation of the base polymer. However, other known polymerization methods can be used, such as mass polymerization and suspension polymerization.

In order to convert the fiber-forming blends containing an increment of the chloroacetate polymers, it is necessary to react the chloroacetate group with a compound which will introduce amido nitrogen atoms. Suitable reagents of this type are thiourea and the various alkyl-substituted thioureas.

In this manner nitrogen atoms are introduced into the molecule which will provide nuclei for chemical reaction with conventional acid dyestuffs. Suitable compounds of this type for use in the development of dye-receptivity are thiourea and alkyl-substituted thioureas having the formula:

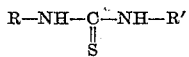

wherein R and R' each represents hydrogen, alkyl radical having less than five carbon atoms, or alkenyl radicals having less than five carbon atoms. R and R' may represent the same or different radicals. Examples of thioureas falling within the scope of the above formula are sym-dimethylthiourea, sym-diisopropylthiourea, N-ethylthiourea, N-methylthiourea, N-allylthiourea, sym-diallylthiourea, N-vinyl-thiourea, N-methallylthiourea, N-isopropenylthiourea, and N-ethyl, N'-methyl thiourea.

The polymer may be treated with the thioureas in granular solid state, in solution in a suitable solvent, and in the form of a spun fiber. If the polymer is in solid form, obviously only the surface will be reacted chemically, and if the polymer is treated in solid form before spinning the activated surface may be substantially diluted when the polymer is dissolved and reformed into fibers. Accordingly, the most effective procedure involves chemical treatment in solution state. The modification may take place in the spinning solution from which the fibers will ultimately be prepared. Accordingly, the polymers are each dissolved, separate or together in suitable solvents, for example, N,N-dimethylformamide, gamma-butyrolactone, ethylene carbonate, or other conventional polyacrylonitrile solvents. On the contrary the modification of the haloacetate-containing blending polymer with the thioureas may be carried out while the blending polymer is in solution in one of the above-named solvents, and the resulting treated polymer solution can then be blended with a solution of the base polymer in the same, or compatible, solvents.

In the practice of this invention the dyeable fiber-forming compositions are prepared by mixing the solid polymers in suitable conventional mechanical mixers, for example, Banbury mixers, roll mills, or dough mixers. In general, it is desirable to add the solvents or plasticizers for fiber-forming acrylonitrile polymers. The intimate mixing of the polymers or blended polymers with the reagent may induce the reaction of substantially all of the chloroacetate groups. Less thorough mixing, especially if the polymer solutions are quite viscous, will induce the reaction of only a small proportion, for example from five to 50 percent, of the chloroacetate groups with the reactant. Under such conditions it will be necessary to add more of the chloroacetate polymers in order to develop the desirable extent of dye-receptivity. Thus, the manner of mixing and the viscosity of the blending mixture must be considered in selecting the proper proportions of polymers.

The new blended compositions may be fabricated into synthetic fibers by conventional wet or dry spinning procedures. After stretching the fibers to develop the necessary orientation and the incident tensile strength, and thereafter shrinking the fibers to improve their thermal resistance, valuable general purpose fibers are obtained.

Further details of this invention are set forth with respect to the following examples:

*Example I*

A blend of 1.2 grams of polyvinyl chloroacetate and 13.9 grams of a copolymer of 95 percent of acrylonitrile and five percent of vinyl acetate was prepared by mixing the dry polymers. The blended mixture was dissolved in 85 grams of N,N-dimethylacetamide and fibers were spun from the solution. A skein of fiber (0.7 gram) was treated for three hours at 100° C. in a dyebath containing 32 cc. of water, 0.014 gram of Wool Fast Scarlet G. Supra dye, 0.07 gram of sulfuric acid, and 0.048 gram of thiourea. The dye acceptance was such that the dyebath was exhausted by the treatment.

*Example II*

A dry blend of 2.6 grams of a copolymer of 67.4 percent of acrylonitrile and 32.6 percent of vinyl chloroacetate, and 14.4 grams of a copolymer of 97 percent of acrylonitrile and three percent of vinyl acetate was dissolved in 83 grams of N,N-dimethylacetamide. The fibers spun from this solution were found to have a tenacity of 3.3 grams per denier. A 1.15 gram skein of this fiber was treated in a dyebath containing 46 grams of water, 0.023 gram of Wool Fast Scarlet G Supra dye, 0.115 gram of sulfuric acid and 0.115 gram of thiourea. A virtually complete exhaustion of the dyebath was obtained in three hours at 100° C.

*Example III*

A mixture of 11.6 grams of polyvinyl chloroacetate and 77.9 grams of a copolymer of 97 percent of acrylonitrile and three percent of vinyl acetate was prepared by mixing the solid polymers. The mixture so obtained was added to 468 grams of N,N-dimethylacetamide and stirred until complete solution took place. Fibers prepared by the procedure described in preceding examples were dyed in a dyebath containing 0.05 percent of Wool Fast Scarlet G Supra dye and 0.25 percent of sulfuric acid. 40 cc. of the dyebath was used for each gram of fiber. Several different treatments were made using 0, 5, 10, 20, and 50 percent of thiourea based on fiber weight. After one hour at 100° C. the sample dyed in the absence of thiourea showed essentially no dye pickup. Although all of the remaining samples were readily dye-receptive, the optimum result was achieved with about ten percent of thiourea (based on fiber weight) in the dyebath.

*Example IV*

Fibers (1.0 gram) composed of a blend of a copolymer of 97 percent acrylonitrile-3 percent vinyl acetate and a copolymer of 60.5 percent acrylonitrile-39.5 percent methallyl chloroacetate, with an overall methallyl chloroacetate content of 8 percent, were immersed for 30 minutes at 95° C. in a bath consisting of 60 mls. of water, 1.3 mls. of two percent Wool Fast Scarlet, 5.9 mls. of three percent sulfuric acid, and 0.1 gram of sym-dimethyl thiourea. The dyebath was exhausted by the treatment and the fiber was dyed a deep scarlet.

*Example V*

The procedure of Example IV was repeated using Alizarin Light Blue 4 GL and Wool Fast Yellow, except that 0.2 g. of thiourea was used in the dye bath. Deep shades were produced on the fibers.

*Example VI*

The procedure of Example IV was repeated with the exception that an allyl chloroacetate copolymer was substituted for a methallyl chloroacetate copolymer. Fibers dyed as in Example IV were dyed deep scarlet with Wool Fast Scarlet.

*Example VII*

The procedure for Example IV was repeated, but N-allylthiourea was substituted for thiourea in the dyeing procedure. Fibers so treated were dyed a scarlet color with Wool Fast Scarlet.

*Example VIII*

The procedure of Example IV was repeated, except a copolymer of 67.4 percent acrylonitrile and 32.6 percent vinyl chloroacetate was blended with a 97 percent acrylonitrile-3 percent vinyl acetate copolymer to give an overall vinyl chloroacetate content of 8 percent. Fibers produced from the composition were dyed in a dye bath containing sym-dimethylthiourea. The fibers were dyed well with Wool Fast Scarlet.

We claim:

1. A dyeable fiber-spinning composition comprising a blend of (A) a polymer of at least 80 percent by weight of acrylonitrile and up to 20 percent of vinyl acetate and (B) a polymer of at least 30 percent by weight of an alkenyl haloacetate of the structure:

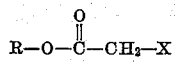

wherein X is a halogen atom selected from the group consisting of chlorine and bromine and R is a radical selected from the group consisting of vinyl, allyl, methallyl and isopropenyl, and up to 70 percent of acrylonitrile, the said blend in fiber form having been reacted in an acid dyebath with a compound of the structure:

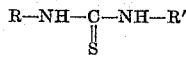

wherein R and R' each represents a member selected from the group consisting of hydrogen and alkyl radicals having less than five carbon atoms, the polymers being blended in such proportions that from 2 to 20 percent of the total weight is the said alkenyl haloacetate.

2. A dyeable composition as defined in claim 1 wherein the haloacetate is vinyl chloroacetate.

3. A dyeable composition as defined in claim 1 wherein the haloacetate is allyl chloroacetate.

4. A dyeable composition as defined in claim 1 wherein the haloacetate is methallyl chloroacetate.

5. A dyeable composition as defined in claim 1 wherein the haloacetate is isopropenyl chloroacetate.

6. A dyeable composition as defined in claim 1 wherein the compound is thiourea.

7. A dyeable composition as defined in claim 1 wherein the compound is sym-dimethylthiourea.

8. A shaped article of the composition as defined in claim 1.

References Cited in the file of this patent

UNITED STATES PATENTS

| | | |
|---|---|---|
| 2,637,620 | Ham | May 5, 1953 |
| 2,643,992 | Gluesenkamp et al. | June 30, 1953 |
| 2,688,008 | Chaney et al. | Aug. 31, 1954 |